United States Patent [19]
Shinpuku et al.

[11] Patent Number: 6,163,421
[45] Date of Patent: Dec. 19, 2000

[54] AZIMUTH MAGNETIC RECORDING AND REPRODUCING APPARATUS AND METHOD EMPLOYING WAVEFORM EQUALIZATION

[75] Inventors: Yoshihide Shinpuku, Kanagawa; Hiroyuki Ino, Gunma; Satoru Higashino, Tokyo, all of Japan

[73] Assignee: Sony Corporation, Tokyo, Japan

[21] Appl. No.: 09/305,932

[22] Filed: May 5, 1999

Related U.S. Application Data

[63] Continuation of application No. PCT/JP98/03932, Sep. 2, 1998.

[30] Foreign Application Priority Data

Sep. 5, 1997 [JP] Japan .................................. 9-241302

[51] Int. Cl.$^7$ ...................................................... G11B 5/09
[52] U.S. Cl. .............................................. 360/46; 360/48
[58] Field of Search ................................... 360/48, 46, 65, 360/67, 21, 40, 53; 375/232, 262, 263, 341; 386/23, 115; 714/701

[56] References Cited

U.S. PATENT DOCUMENTS

| | | | |
|---|---|---|---|
| 4,888,775 | 12/1989 | Karabed et al. | 714/755 |
| 4,888,779 | 12/1989 | Karabed et al. | 714/792 |
| 5,280,489 | 1/1994 | Fredrickson et al. | 714/788 |
| 5,550,683 | 8/1996 | Koren | 360/65 X |
| 5,680,269 | 10/1997 | Georgis et al. | 360/77.13 X |
| 5,784,415 | 7/1998 | Chevillat et al. | 360/65 X |

FOREIGN PATENT DOCUMENTS 8-46526  2/1996  Japan .

OTHER PUBLICATIONS

"Performance of TCPR in Magnetic Azimuth Recording", Shinpuku et al, IEEE Trans on Maga, vol. 34, No. 1, pp. 124–128, Jan. 1998.

"8/10 PR1ML for High Density and High Rate Tape Storage Systems", Ino et al, IEEE Trans on Mags, vol. 31, No. 6, pp 3036–3038, Nov. 1995.

"Improved Trellis–Coding for Partial–Response Channels", Fredrickson et al, IEEE Trans on Mag., vol. 31, No. 2, pp.1141–1148, Mar. 1995.

"On the Performance of a Rate 8/10 Matched Spectral Null Code for Class–4 Partial Response", IEEE Trans. on Mag., vol. 28, No. 5, pp. 2883–2888, Sep. 1992.

"Performance of Trellis Coded Class–1 Partial–Response", Ino et al, IEEE Trans. on Mag., vol. 33, No. 5, pp. 2752–2754, Apr. 1997.

*Primary Examiner*—Alan T. Faber
*Attorney, Agent, or Firm*—Limbach & Limbach L.L.P.

[57] ABSTRACT

The present invention relates to an apparatus for azimuth-recording data on a magnetic recording medium. Heads (13a) and (13b) having azimuth angles different from each other are used and data are recorded on and reproduced from a plurality of adjacent tilted recording tracks on a magnetic tape T. A recording-system encoder (23) converts data to a code sequence in which null points of frequency spectrums are respectively provided at null points of waveform equalization characteristics of partial responses such as PR1, PR4, etc. For example, record-coding using a 8/10MSN code is performed. A reproduction-system equalizing circuit (28) performs waveform equalization based on the partial responses. Further, a data detector (29) detects the data by a Viterbi coding method for executing state transition during which the characteristic of the code sequence is adopted. Azimuth-recording in a narrow track width can be easily achieved while a reduction in effective recording speed due to an increase in the azimuth angle is being controlled.

30 Claims, 15 Drawing Sheets

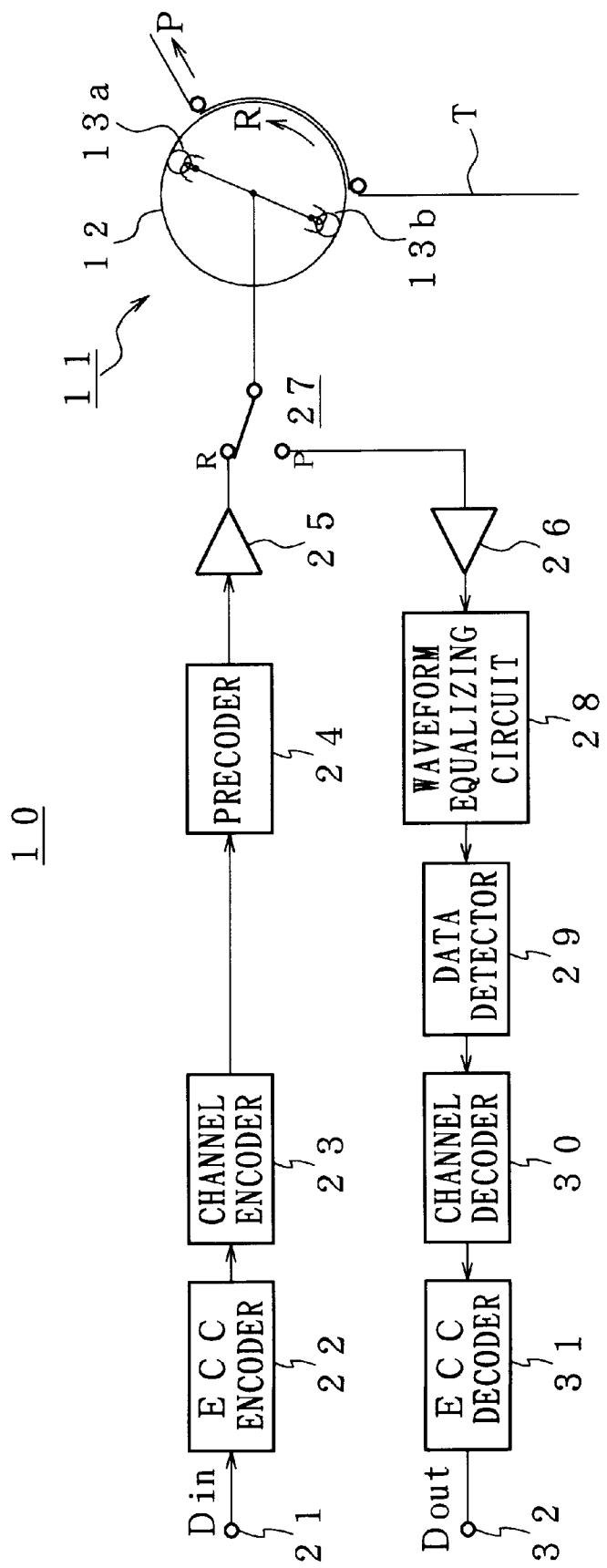

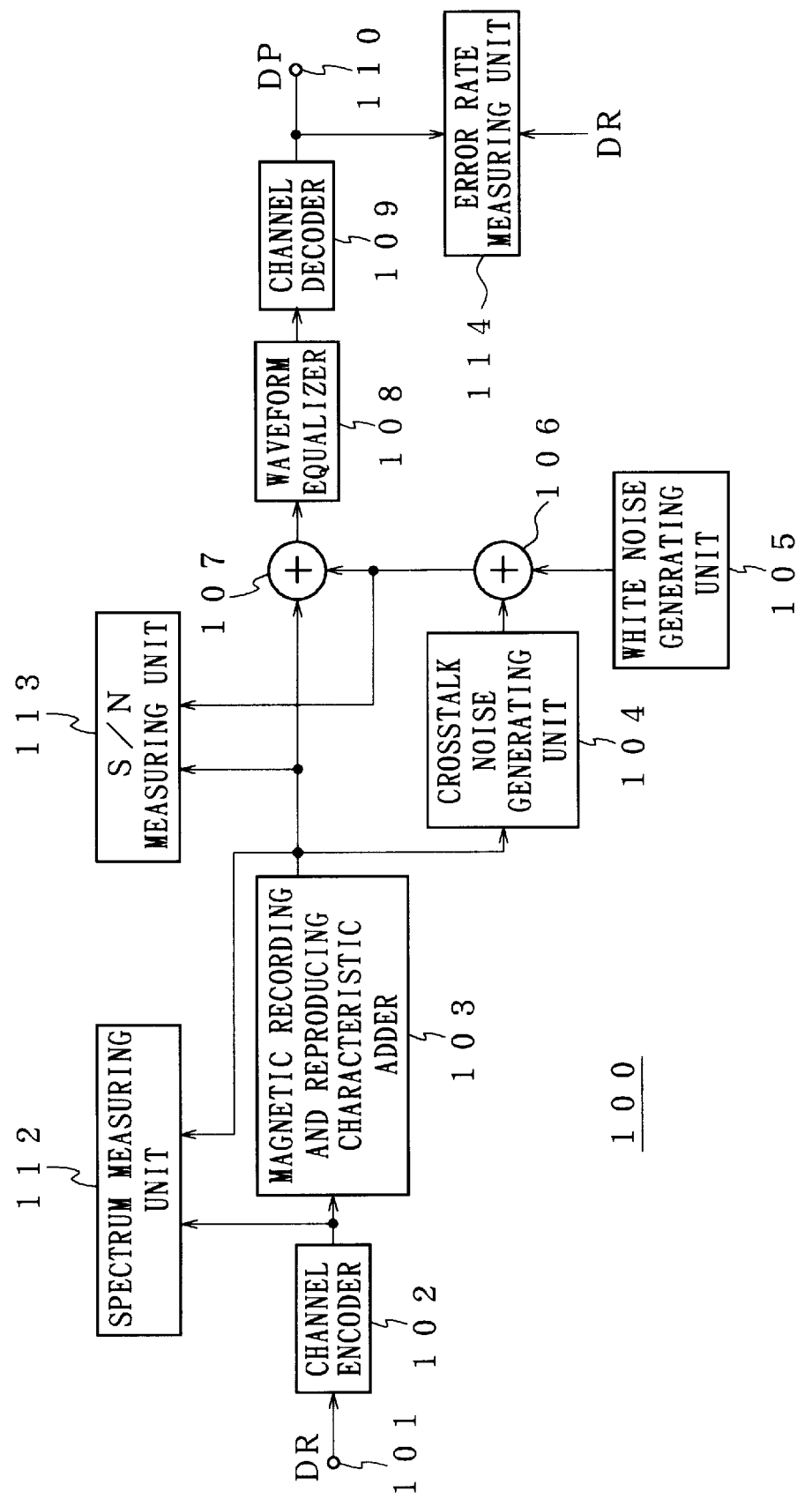

F I G. 6A  MAGNETIC RECORDING AND REPRODUCING CHARACTERISTIC
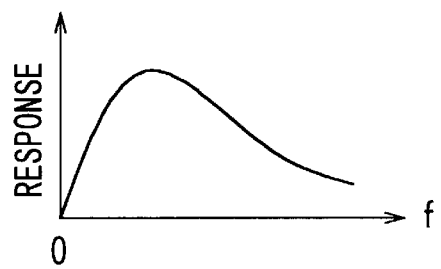
F I G. 6B  WAVEFORM EQUALIZATION CHARACTERISTIC OF PR4
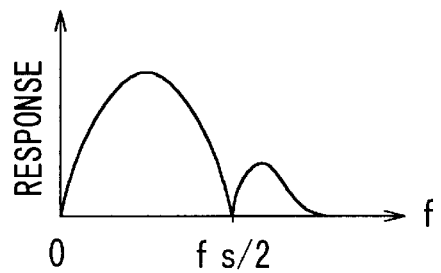
F I G. 6C  WAVEFORM EQUALIZATION CHARACTERISTIC OF PR1
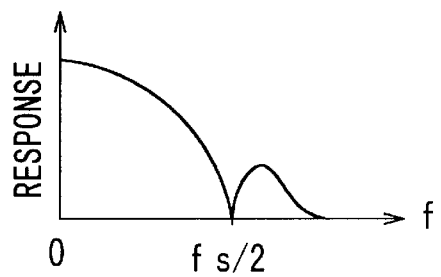
F I G. 6D  POWER SPECTRUM OF RECORDED DATA DR
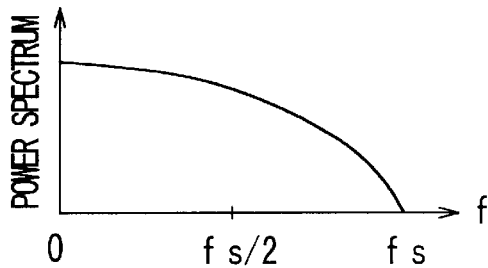
F I G. 6E  POWER SPECTRUM OF 8/10MSN CODE
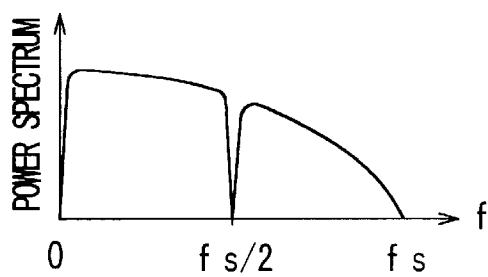

F I G. 1 5
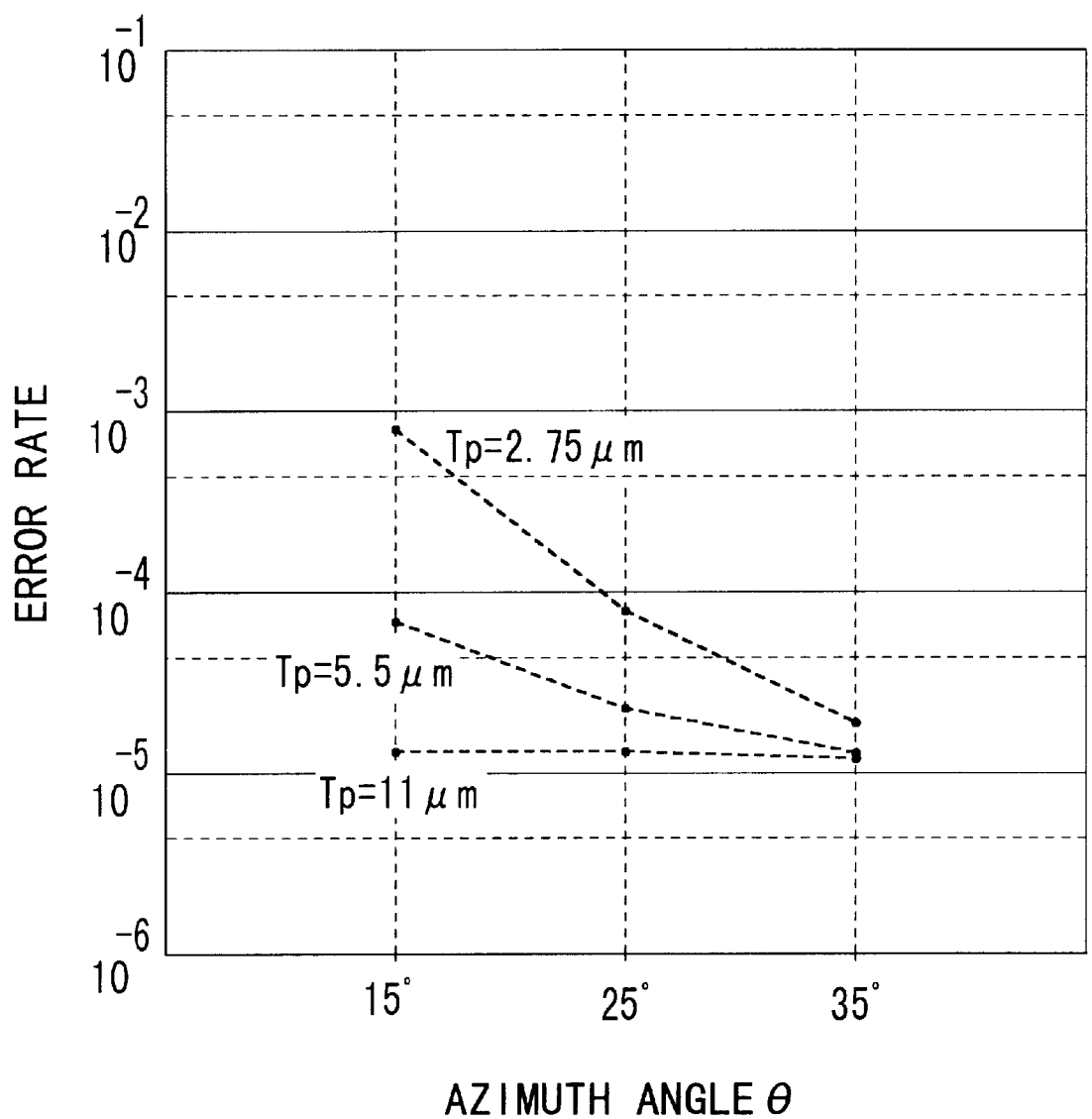

AZIMUTH MAGNETIC RECORDING AND REPRODUCING APPARATUS AND METHOD EMPLOYING WAVEFORM EQUALIZATION

This application is a continuation of international application number PCT JP/98/03932 filed Sep. 2, 1998, now pending.

TECHNICAL FIELD

The present invention relates to a magnetic recording apparatus for and a magnetic recording method of azimuth-recording data on a magnetic recording medium, a magnetic reproducing apparatus for and a magnetic reproducing method of reproducing the data from the magnetic recording medium, and a magnetic recording and reproducing apparatus and a magnetic recording and reproducing method.

BACKGROUND ART

Recording and reproduction of digital data in large quantity have been often performed in recent years. It is now desirable to increase a recording density for a magnetic recording medium such as a magnetic tape, a magnetic disk or the like. In order to increase the recording density, a high-efficiency modulation scheme is used as a digital-data modulation scheme, and a reduction in track width or a decrease in track pitch has been performed as well as the shortening of a recording wavelength.

However, when the track pitch is shortened, crosstalk noise increases due to the leakage of magnetic flux from an adjacent track and hence S/N (signal-to-noise) is reduced or an error rate deteriorates. While a azimuth angle has heretofore been increased to reduce the crosstalk noise, this is on its way to becoming the limit due to a reduction in effective recording speed. Namely, it has been difficult to increase the recording density by azimuth-recording in a narrow track width.

An object of the present invention is to provide a magnetic recording apparatus and a magnetic recording method or the like capable of easily implementing azimuth-recording in a narrow track width.

DISCLOSURE OF THE INVENTION

A magnetic recording apparatus according to the present invention comprises data input means for allowing data to be input, coding means for converting the data to a code sequence in which DC is free and null points of each frequency spectrum are respectively provided at null points of a waveform equalization characteristic of a predetermined partial response, and recording means having a first recording head with a first azimuth angle and a second recording head with a second azimuth angle different from the first azimuth angle so that the recording means records part of the code sequence onto a first track on a magnetic recording medium through the use of the first recording head and records the other part of the code sequence onto a second track adjacent to the first track on the magnetic recording medium through the use of the second recording head.

A magnetic reproducing apparatus, according to the present invention, for reproducing data from a magnetic recording medium wherein data are converted to a code sequence in which DC is free and null points of a frequency spectrum are respectively provided at null points of a waveform equalization characteristic of a predetermined partial response, and the magnetic recording medium having a first track on which part of the code sequence is recorded by a first recording head having a first azimuth angle and a second track adjacent to the first track, on which the other part of the code sequence is recorded by a second recording head having a second azimuth angle different from the first azimuth angle, comprises reproducing means having a first reproducing head with an azimuth angle identical to the first azimuth angle and a second reproducing head with an azimuth angle identical to the second azimuth angle so that the reproducing means reproduces a signal from the first track by means of the first reproducing head and reproduces a signal from the second track by means of the second reproducing head, waveform equalizing means for effecting waveform equalization based on the predetermined partial response on the signals reproduced by the first and second reproducing heads, data detecting means for detecting the code sequence from the waveform-equalized signals by maximum likelihood decoding, and decoding means for decoding the detected code sequence thereby to obtain the data.

A magnetic recording and reproducing apparatus according to the present invention comprises data input means for allowing data to be input, coding means for converting the data to a code sequence in which DC is free and null points of each frequency spectrum are respectively provided at null points of a waveform equalization characteristic of a predetermined partial response, access means having a first head with a first azimuth angle and a second headwith a second azimuth angle different from the first azimuth angle so that the access means records part of the code sequence onto a first track on a magnetic recording medium through the use of the first head, records the other part of the code sequence onto a second track adjacent to the first track on the magnetic recording medium through the use of the second head, reproduces a signal from the first track by using the first head and reproduces a signal from the second track by using the second head, waveform equalizing means for effecting waveform equalization based on the predetermined partial response on the signals reproduced by the first and second heads, data detecting means for detecting the code sequence from the wave form-equalized signals by maximum likelihood decoding, and decoding means for decoding the detected code sequence thereby to obtain the data.

A magnetic recording method according to the present invention comprises a data inputting step for allowing data to be input, a coding step for converting the data to a code sequence in which DC is free and null points of a frequency spectrum are respectively provided at null points of a waveform equalization characteristic of a predetermined partial response, and a recording step for recording part of the code sequence onto a first track on a magnetic recording medium by using a first recording head having a first azimuth angle and recording the other part of the code sequence onto a second track adjacent to the first track on the magnetic recording medium by using a second recording head having a second azimuth angle different from the first azimuth angle.

A magnetic reproducing method, according to the present invention, for reproducing data from a magnetic recording medium, wherein data are converted to a code sequence in which DC is free and null points of a frequency spectrum are respectively provided at null points of a waveform equalization characteristic of a predetermined partial response, and the magnetic recording medium has a first track on which part of the code sequence is recorded by a first recording head having a first azimuth angle and a second track adjacent to the first track, on which the other part of the code sequence is recorded by a second recording head having a second azimuth angle different from the first azimuth angle, comprises a reproducing step for reproducing a signal from the first track by using a first reproducing head having an azimuth angle identical to the first azimuth angle and reproducing a signal from the second track by using a second reproducing head having an azimuth angle identical to the second azimuth angle, a waveform equalizing step for effecting waveform equalization based on the predetermined partial response on the signals reproduced by the first and second reproducing heads, a data detecting step for detecting the code sequence from the waveform-equalized signals by maximum likelihood decoding, and a decoding step for decoding the detected code sequence thereby to obtain the data.

A magnetic recording and reproducing method according to the present invention comprises a data inputting step for allowing data to be input, a coding step for converting the data to a code sequence in which DC is free and null points of a frequency spectrum are respectively provided at null points of a waveform equalization characteristic of a pre-determined partial response, a recording step for recording part of the code sequence onto a first track on a magnetic recording medium by using a first head having a first azimuth angle and recording the other part of the code sequence onto a second track adjacent to the first track on the magnetic recording medium by using a second head having a second azimuth angle different from the first azimuth angle, a reproducing step for reproducing a signal from he first track by using the first head and reproducing a signal from the second track by using the second head, a waveform equalizing step for effecting waveform equalization based on the predetermined partial response on the signals reproduced by the first and second heads, a data detecting step for detecting the code sequence from the waveform-equalized signals by maximum likelihood decoding, and a decoding step for decoding the detected code sequence thereby to obtain the data.

In the present invention, first and second magnetic heads different in azimuth angle from each other are used to record data on a plurality of adjacent recording tracks on a magnetic recording medium such as a magnetic tape, a magnetic disk or the like. In this case, the data are converted to a code row or sequence in which DC is free and null points of a frequency spectrum are respectively provided at null points of a waveform equalization characteristic of a reproduction-system partial response, and thereafter the converted data are recorded. Further, the first and second magnetic heads are used to reproduce the data from the plurality of adjacent recording tracks on the magnetic recording medium. In this case, waveform equalization based on a partial response is effected on the reproduced signal. Thereafter, the detection of the data and the decoding of the code sequence are carried out. For example, a class 4 and a class 1 are used as the partial response. The data detection is performed by maximum likelihood decoding such as Viterbi decoding or the like.

Although crosstalk noise is comprised principally of low-frequency noise, the crosstalk noise is reduced because the data are converted to the DC-free code sequence and thereafter the converted data are recorded as described above. Further, since the waveform equalization based on the partial response is effected on the reproduced signal and thereafter the data detection is performed, S/N allowable to obtain a predetermined error rate is reduced. Further, since the data are converted to the code sequence having the null points at the null points of the waveform equalization characteristic of the reproduction-system partial response and thereafter the converted code sequence is recorded, the ability to detect the data increases when, for example, the data detection is carried out by the maximum likelihood decoding such as the Viterbi decoding for executing state transition during which the characteristic of a recording code is adopted, and S/N allowable to obtain a predetermined error rate is further reduced. It is thus easy to implement azimuth-recording in a narrow track width.

BRIEF DESCRIPTION OF THE DRAWINGS

FIG. 1 is a block diagram showing a configuration of a magnetic tape recording and reproducing apparatus defined as an embodiment;

FIG. 5 is a block diagram illustrating an outline of an evaluation system;

FIGS. 6A through 6E are respectively diagrams showing a magnetic recording and reproducing characteristic, waveform equalization characteristics of a class 4 and class 1 of a partial response, a power spectrum of a 8/10MSN code, etc.;

Figure 8:
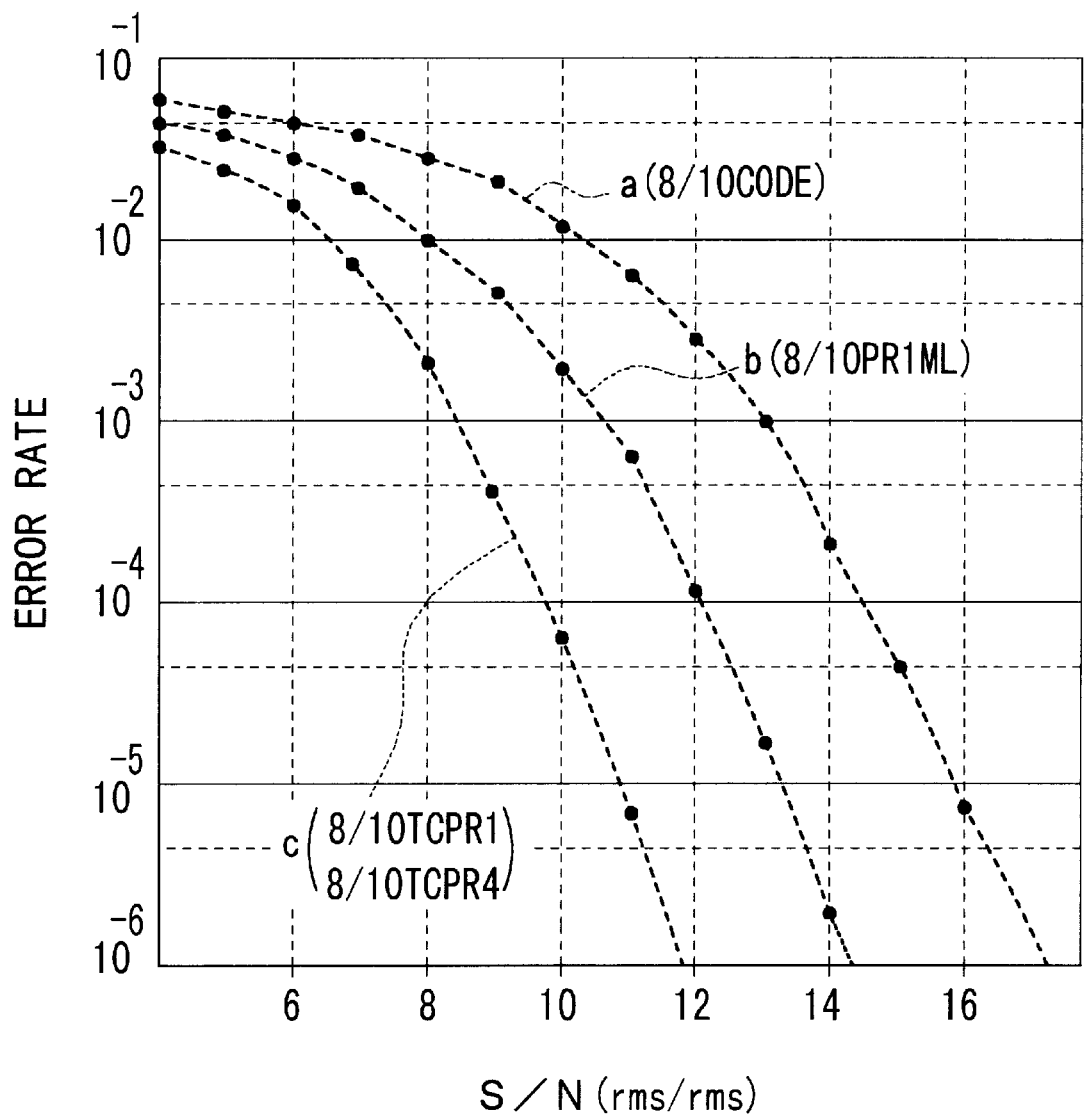
Figure 9:
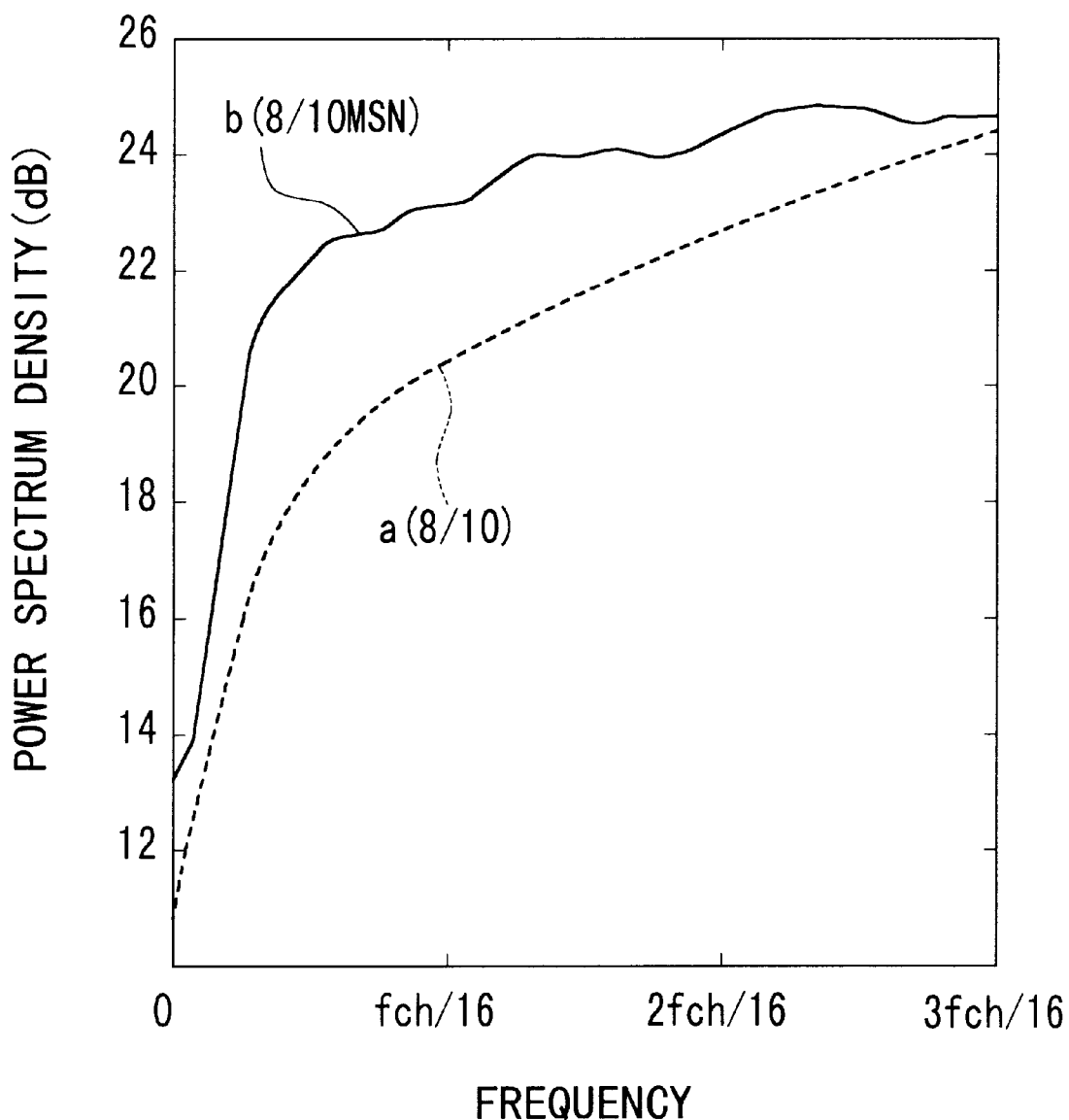
Figure 10:
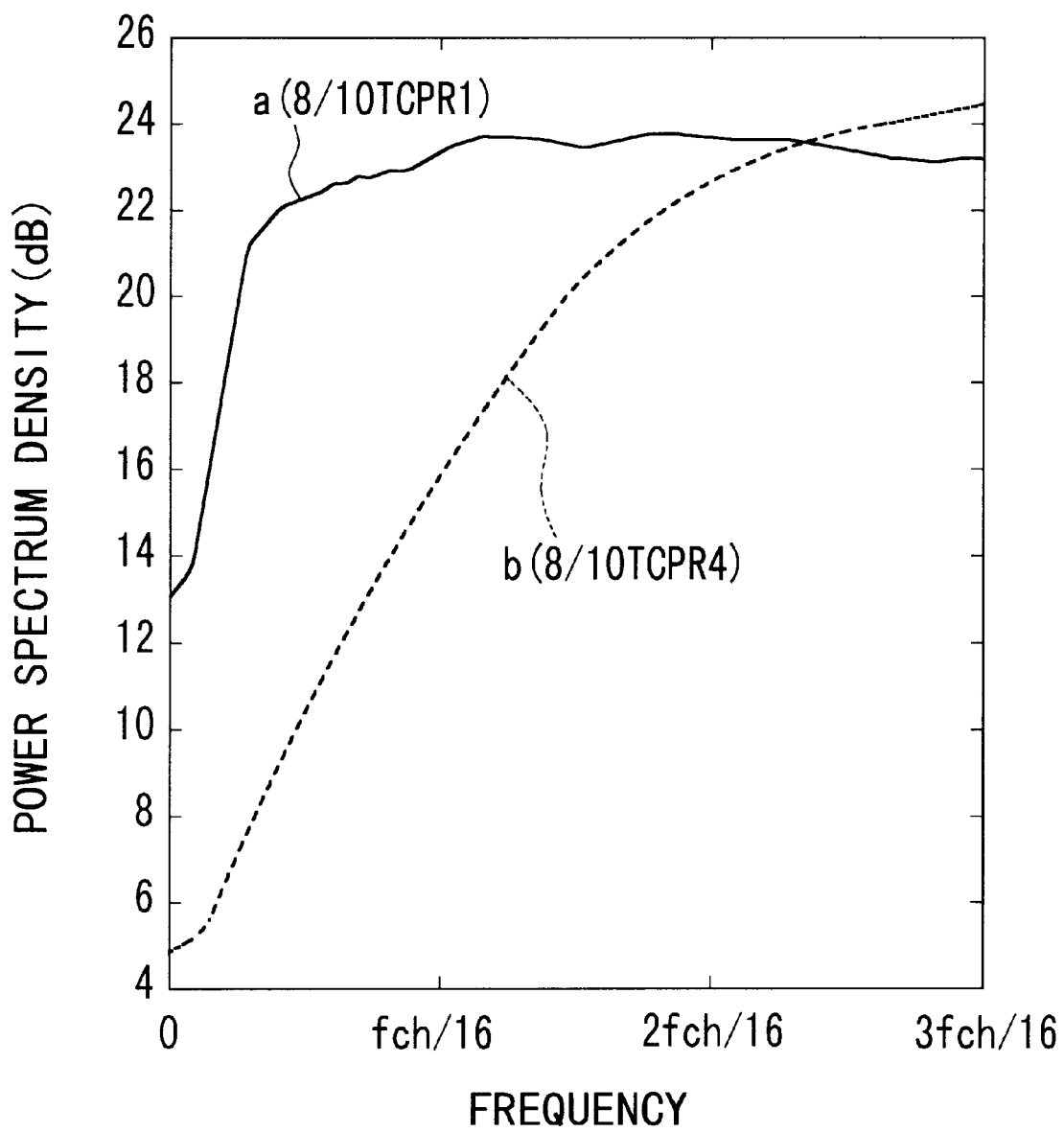
Figure 11:
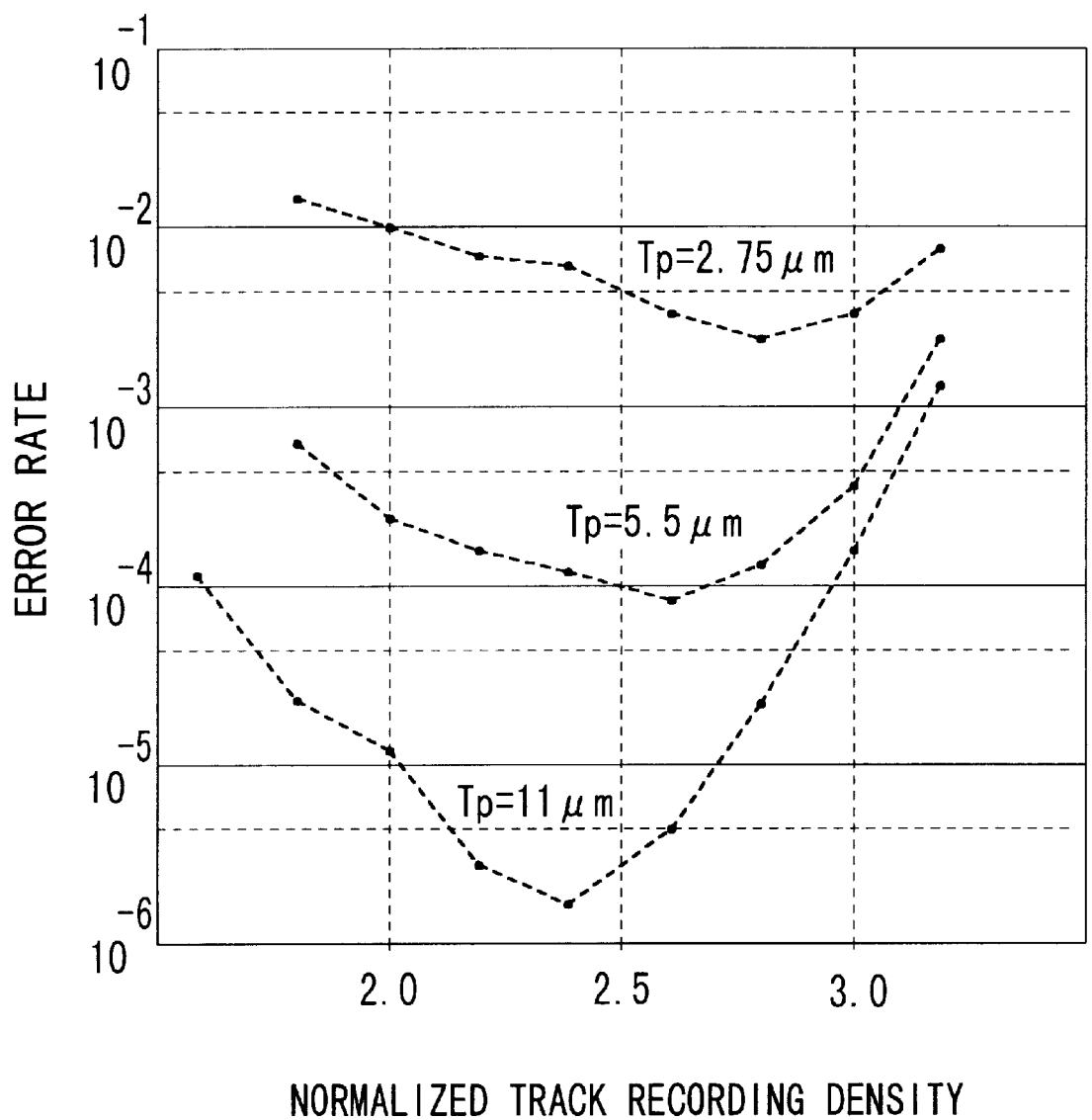
Figure 12:
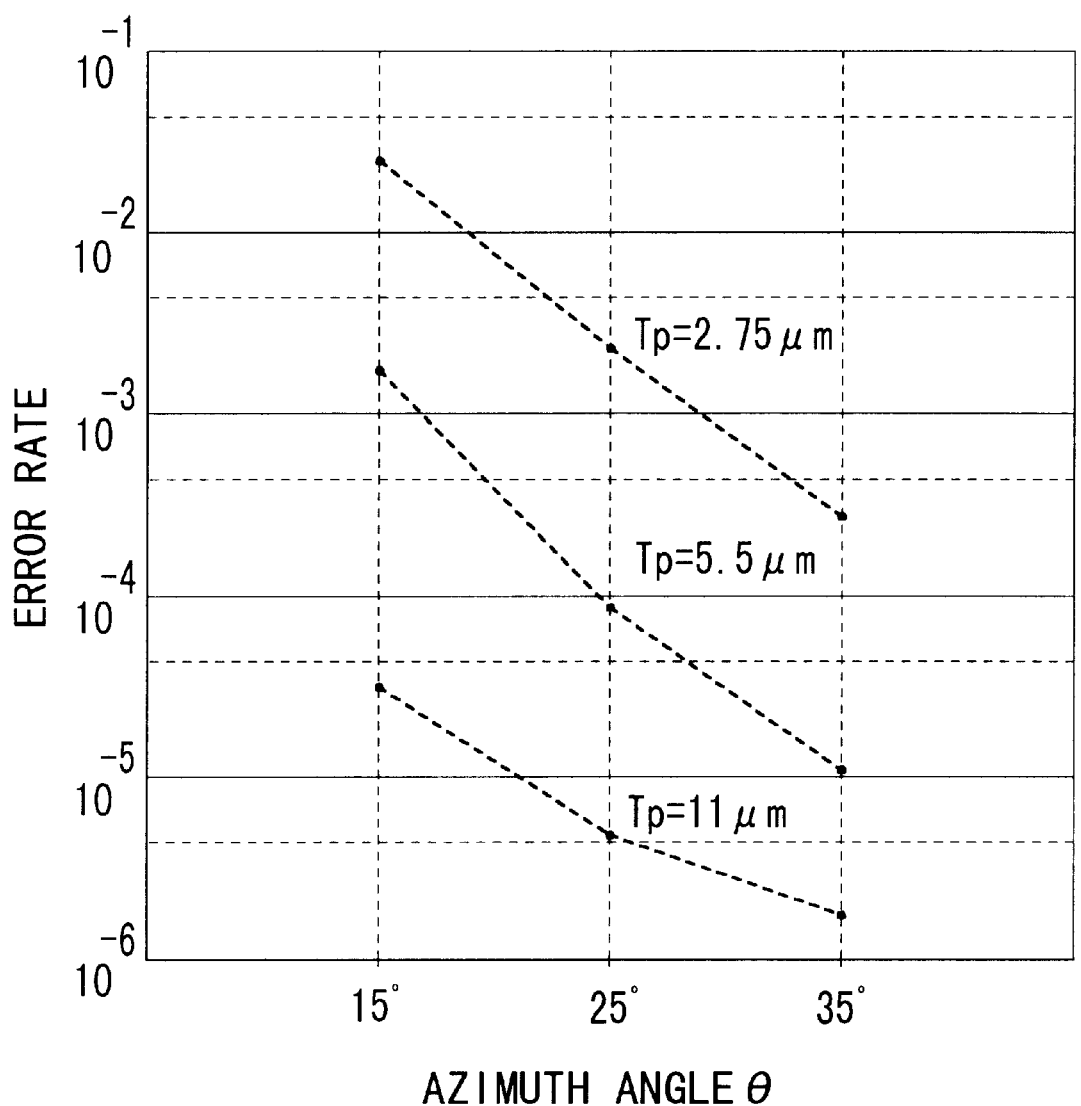
Figure 13:
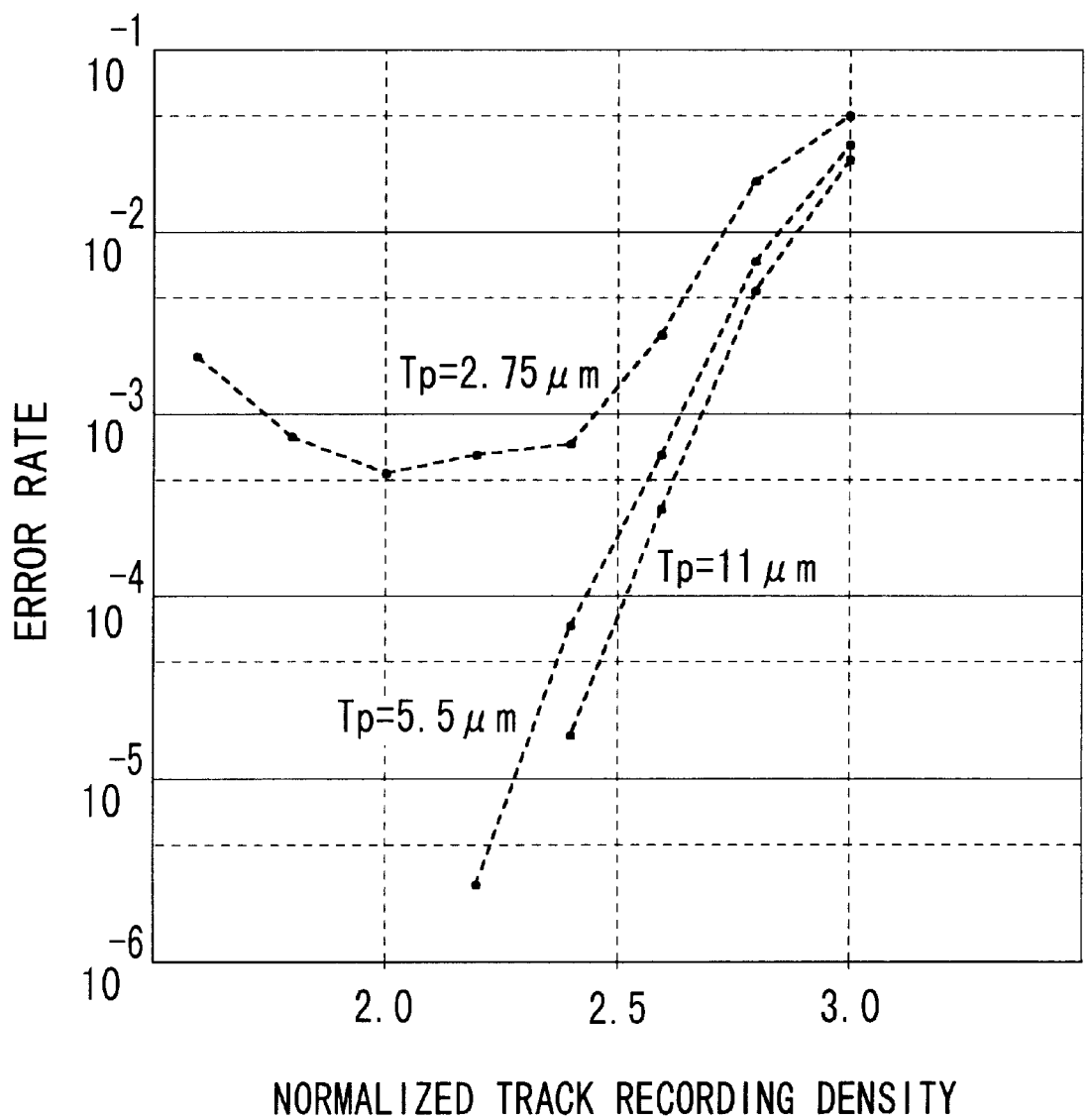
Figure 14:
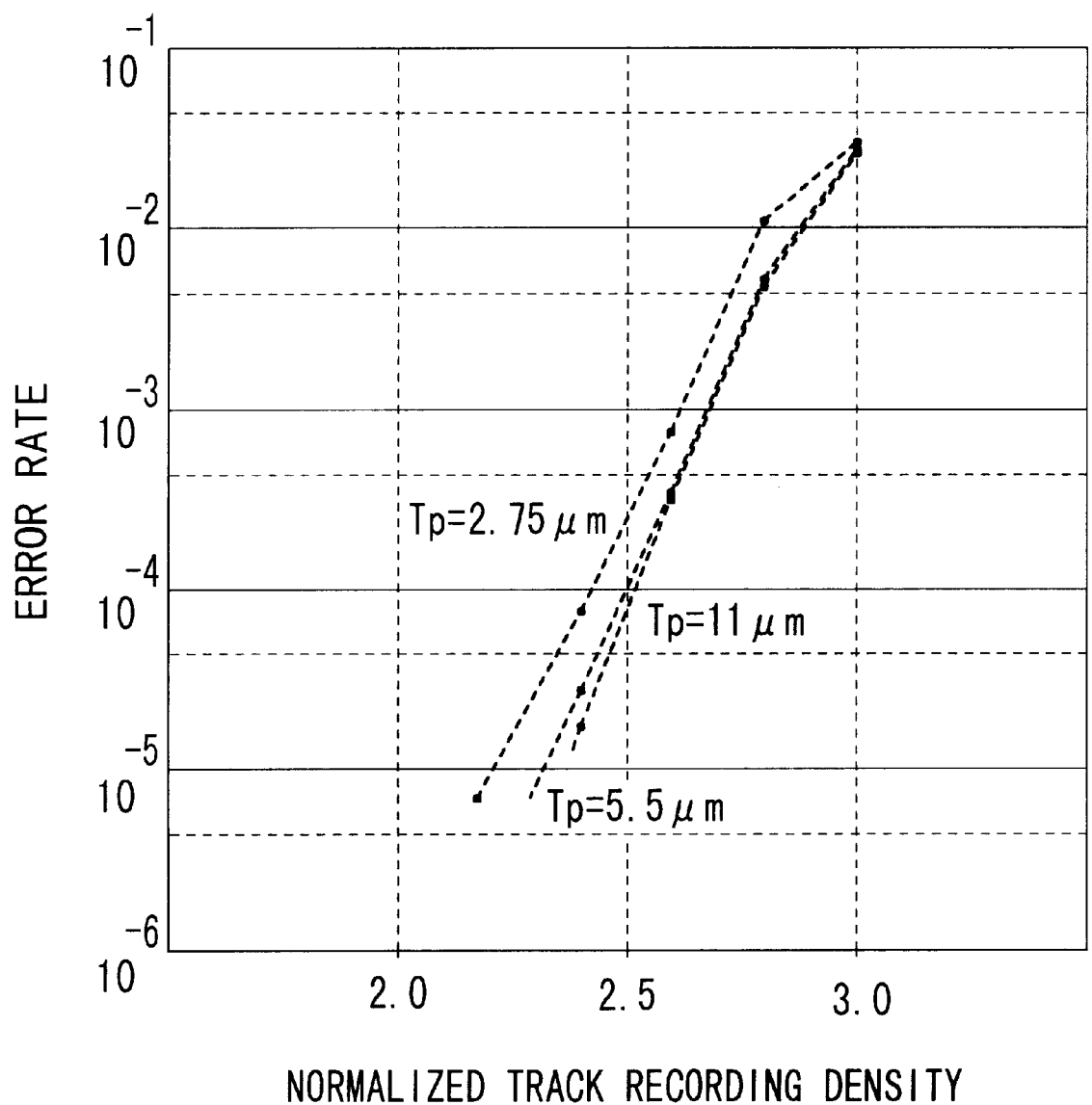
Figure 16:
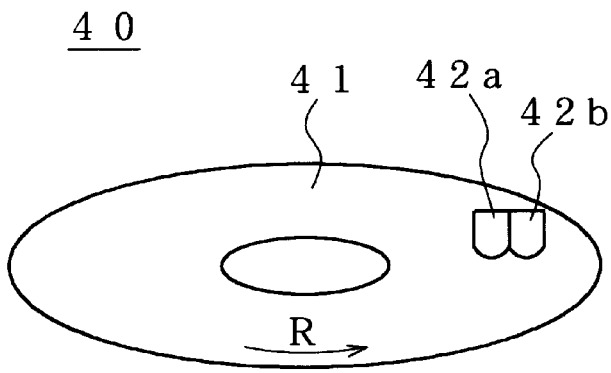
Figure 17:
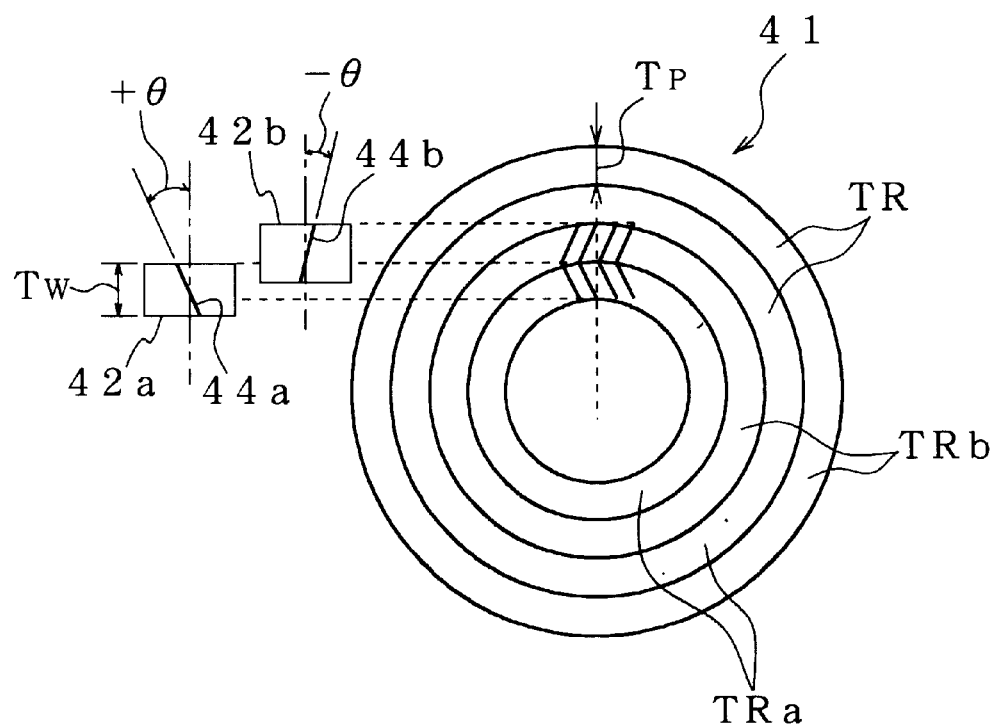

RIG. 7 is a diagram illustrating the relationship between a crosstalk level, recorded wavelengths and track widths (track pitches);

FIG. 8 is a diagram depicting the relationship between the S/N of each of various 8/10-modulation systems and an error rate thereof;

FIG. 9 is a diagram showing power spectrum densities of a 8/10 code and a 8/10MSN code;

FIG. 10 is a diagram illustrating power spectrum densities of a 8/10TCPR1 and a 8/10TCPR4;

FIG. 11 is a diagram depicting the relationship (azimuth angle $\theta=25°$) between a normalized track recording density of the 8/10CPR1 and each error rate thereof at the time that a recording track pitch is changed;

FIG. 12 is a diagram showing the relationship (normalized track recording density: 2.6) between an azimuth angle of the 8/10TCPR1 and each error rate thereof at the time that the recording track pitch is varied;

FIG. 13 is a diagram illustrating the relationship (azimuth angle $\theta=15°$) between a normalized track recording density of a 8/10TCPR4 and each error rate thereof at the time that the recording track pitch is varied;

FIG. 14 is a diagram depicting the relationship (azimuth angle $\theta=25°$) between a normalized track recording density of the 8/10TCPR4 and each error rate thereof at the time that the recording track pitch is changed;

FIG. 15 is a diagram showing the relationship (normalized track recording density: 2.4) between an azimuth angle of the 8/10CPR4 and each error rate thereof at the time that the recording track pitch is changed;

FIG. 16 is diagram illustrating a principal part of a magnetic disk recording and reproducing apparatus defined as another embodiment; and FIG. 17 is a diagram depicting disk patterns.

BEST MODE FOR CARRYING OUT THE INVENTION

FIG. 1 shows a configuration of a magnetic tape recording and reproducing apparatus 10 defined as an embodiment.

Figure 2:
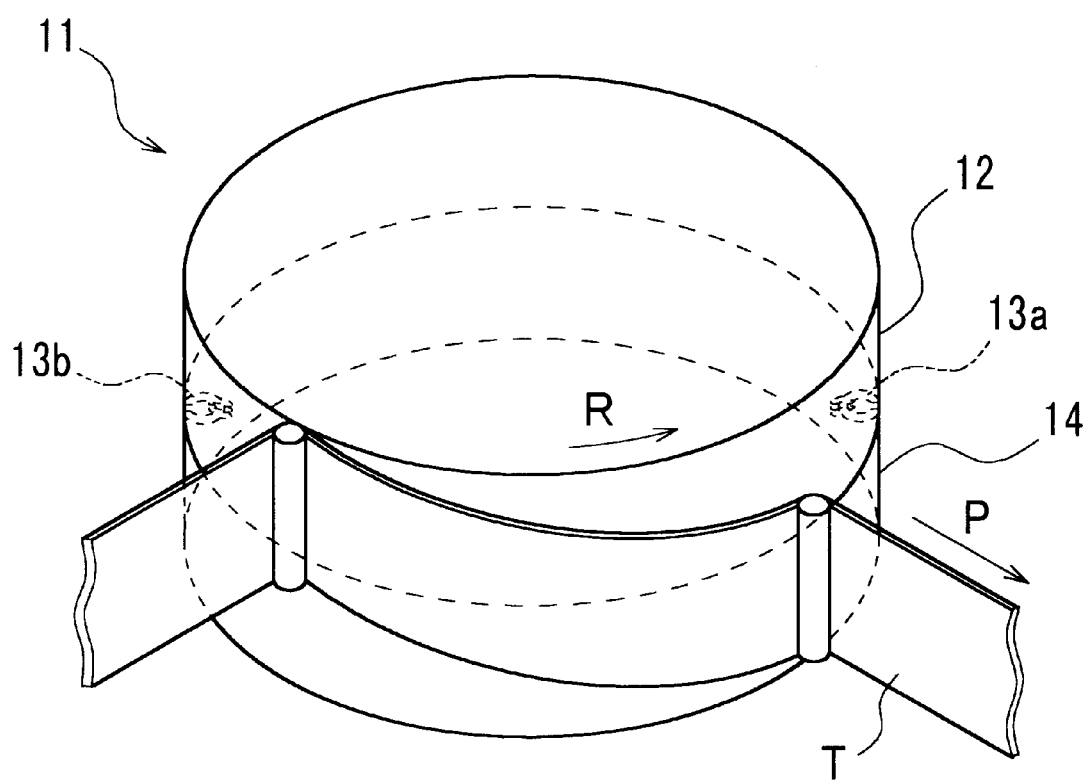
FIG. 2 is a perspective view illustrating a configuration of a rotating head device.

The recording and reproducing apparatus 10 has a rotating head device 11 for recording digital data on a plurality of adjacent tilted recording tracks on a magnetic tape T and reproducing the same therefrom. FIG. 2 shows an outline of the rotating head device 11. Two magnetic heads 13a and 13b are attached to a rotatable drum 12. These magnetic heads 13a and 13b are rotated in synchronism with the rotation of the rotatable drum 12. An arrow R indicates the direction of rotation of the rotatable drum 12. Further, the magnetic tape T is wound on the outer peripheries of the rotatable drum 12 and a fixed drum 14 on the skew upon recording and reproduction. In this state, the magnetic tape T runs in the direction indicated by an arrow P at a predetermined speed.

Figure 3:
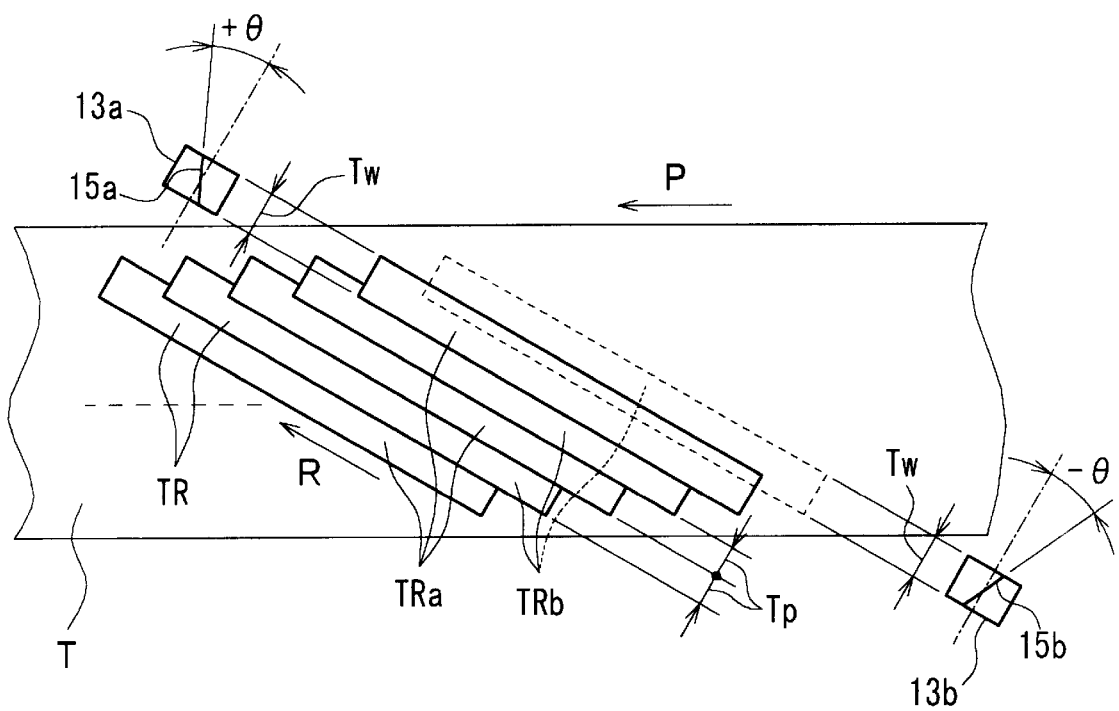
FIG. 3 is a diagram depicting tape patterns.

Owing to such a rotatable head device 11, a plurality of recording tracks TR shown in FIG. 3, for example are recorded and formed on the magnetic tape T diagonally to the running direction P of the magnetic tape T. The recording tracks TRa and TRb are respectively recorded and formed by the magnetic heads 13a and 13b. Although not mentioned above, the magnetic heads 13a and 13b are different in azimuth angle from each other. Namely, gaps 15a and 15b of the magnetic heads 13a and 13b are respectively formed so as to be inclined toward a track width or pitch by +θ and −θ, whereby azimuth-recording is performed.

In order to achieve high-density recording, head widths (reproducing track widths) Tw of the magnetic heads 13a and 13b are formed narrowly and a track pitch Tp is also set smaller than the head width Tw. When the magnetic heads 13a and 13b scan a given recording track TR upon reproduction, they are set so as to scan even parts of its adjacent tracks.

Referring back to FIG. 1, the recording and reproducing apparatus 10 has an input terminal 21 for inputting or receiving digital data Din used as recorded data, an ECC encoder 22 for adding an error correcting code to the digital data Din, a channel encoder 23 for effecting a record encoding process (digital modulating process) on data outputted from the ECC encoder 22, and a predecoder 24 for converting data outputted from the channel encoder 23 to an intermediate-sequential code to avoid the propagation of a code error upon identification.

Further, the recording and reproducing apparatus 10 has a recording amplifier 25 for amplifying a recorded signal outputted from the predecoder 24, a playback amplifier 26 for amplifying a signal reproduced by the magnetic head 13a and 13b, and a recording and reproducing selector switch 27 for supplying a signal outputted from the recording amplifier 25 to the magnetic heads 13a and 13b upon recording and supplying the reproducing signal from the magnetic heads 13a and 13b to the playback amplifier 26 upon reproduction. In this case, a fixed terminal on the R side of the selector switch 27 is electrically connected to the output side of the recording amplifier 25, whereas a fixed terminal on the P side thereof is electrically connected to the input side of the playback amplifier 26. Further, a movable terminal of the selector switch 27 is electrically connected to the magnetic heads 13a and 13b. The selector switch 27 is electrically connected to the R side upon recording and electrically connected to the P side upon reproducing.

Moreover, the recording and reproducing apparatus 10 has a waveform equalizing circuit 28 for effecting waveform equalization based on a partial response on the reproduced signal amplified by the playback amplifier 26, a data detector 29 for detecting data from the reproduced signal subjected to the waveform equalization by the waveform equalizing circuit 28, a channel decoder 30 for performing a record-code decoding process (demodulating process) on the data outputted from the data detector 29, an ECC decoder 31 for effecting an error correcting process on data outputted from the channel decoder 30, and an output terminal 32 for outputting digital data Dout outputted from the ECC decoder 31 as reproduced data.

The operation of the magnetic tape recording and reproducing apparatus 10 shown in FIG. 1 will be explained. Upon recording, the digital data Din are supplied to the input terminal 21 as the recorded data. An error correcting code is added to the digital data Din by the ECC encoder 22. The output data of the ECC encoder 22 are subjected to record-encoding by the channel encoder 23 and converted to intermediate sequential form to obtain a record signal. The record signal is supplied to the magnetic heads 13a and 13b through the R side of the selector switch 27, where it is azimuth-recorded on the plurality of recording tracks TR on the magnetic tape T in sequence.

Upon reproduction, the magnetic heads 13a and 13b successively scan the plurality of recording tracks TR on the magnetic tape T, so that the reproduced signal is obtained from these magnetic heads 13a and 13b. The reproduced signal is supplied to the waveform equalizing circuit 28 through the P side of the selector switch 27, where it is subjected to partial response-based waveform equalization. The reproduced signal subjected to the waveform equalization by the waveform equalizing circuit 28 is supplied to the data detector 29 where data detection is done. Further, the channel decoder 30 effects the record-code decoding process on the output data of the data detector 29. Further, the ECC decoder 31 performs the error correcting process on the data. The digital data Dout subjected to the error correcting process are allowed to lead to the output terminal 32 as the reproduced data.

A description will next be made relating to the recording and reproducing apparatus 10 shown in FIG. 1, as to which type the system of record-coding, the class of the partial response and the system for the detection of the reproduced data should be set and to which extent the width (track pitch Tp) of the track, the azimuth angles +θ and −θ of the magnetic heads 13a and 13b and the widths Tw of the magnetic heads 13a and 13b should be set.

Figure 4:
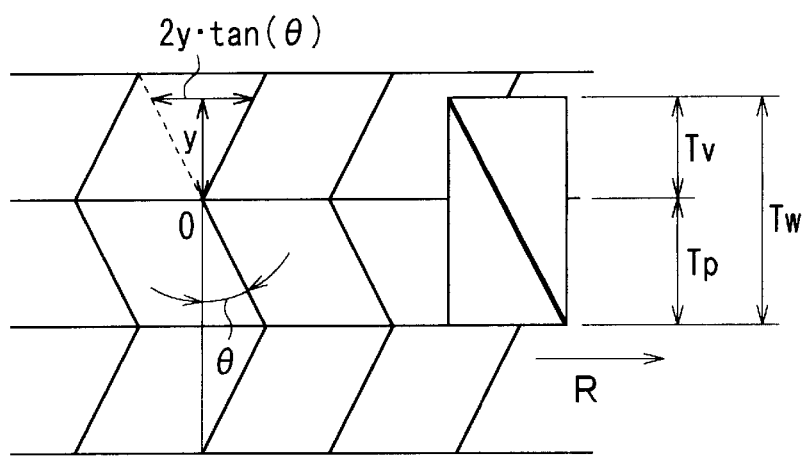
FIG. 4 is a diagram showing azimuth patterns on a magnetic tape.

FIG. 4 shows part of an azimuth-recording pattern on the magnetic tape in enlarged form. An overlap track width Tv is equivalent to a value obtained by subtracting the track width (track pitch) Tp from the head width (reproducing track width) Tw, i.e., it has the relations in Tv=Tw−Tp. If magnetization patterns of adjacent tracks are compared with a magnetization pattern of the present track, then they are shifted in phase by 2ytan(θ). Therefore, an azimuth effect represented by the following equation (1) is obtained. It is understood from the present equation (1) that the azimuth effect is determined by four parameters of the head width Tw, overlap track width Tv, recording wavelength λ and azimuth angle θ.

$$F(\lambda, \theta, T_p, T_v) = \left| \frac{\sin\left(\frac{2T_v \cdot \pi \cdot \tan(\theta)}{\lambda}\right)}{\frac{2T_p \cdot \pi \cdot \tan(\theta)}{\lambda}} \right| \quad (1)$$

FIG. 5 schematically shows a configuration of an evaluation system 100 used to perform various evaluations as will be described later upon selecting the system for the record-coding, the class of the partial response and the system for the detection of the reproduced data and setting the width of truck (truck pitch Tp), the azimuth angles +θ and −θ of the magnetic heads 13a and 13b and the head widths Tw of the magnetic heads 13a and 13b.

The present evaluation system 100 has an input terminal 101 for inputting or receiving recorded data DR for evaluation, a channel encoder 102 for performing a record-coding process on the recorded data DR, and a magnetic recording and reproducing characteristic adder 103 for adding a magnetic recording and reproducing characteristic shown in FIG. 6A to an output signal (record signal) outputted from the channel encoder 102. The magnetic recording and reproducing characteristic adder 103 is comprised of a digital filter, for example.

The evaluation system 100 also has a crosstalk noise generating unit 104 for generating crosstalk noise from an output signal (reproducing signal) of the magnetic recording and reproducing characteristic adder 103 by reference to the azimuth effect given by the equation (1), a white noise generating unit 105 for generating white noise, an adder 106 for adding the crosstalk noise generated from the crosstalk noise generating unit 104 and the white noise generated from the white noise generating unit 105, and an adder 107 for adding noise outputted from the adder 106 to the output signal of the magnetic recording and reproducing characteristic adder 103.

Further, the evaluation system 100 has a waveform equalizer 108 for performing a waveform equalizing process on a signal outputted from the adder 107, a channel decoder 109 for effecting a decoding process on a signal outputted from the waveform equalizer 108, and an output terminal 110 for outputting output data of the channel decoder 109 as reproduced data DP.

Moreover, the evaluation system 100 has a spectrum measuring unit 112 for measuring power spectrums of the output signal of the channel encoder 102 and the output signal of the magnetic recording and reproducing characteristic adder 103, an S/N measuring unit 113 for measuring S/N based on the output signal of the magnetic recording and reproducing characteristic adder 103 and output noise of the adder 106, and an error rate measuring unit 114 for comparing the reproduced data DP outputted from the channel decoder 109 with the recorded data DR, for example thereby to measure an error rate.

Figure 7:
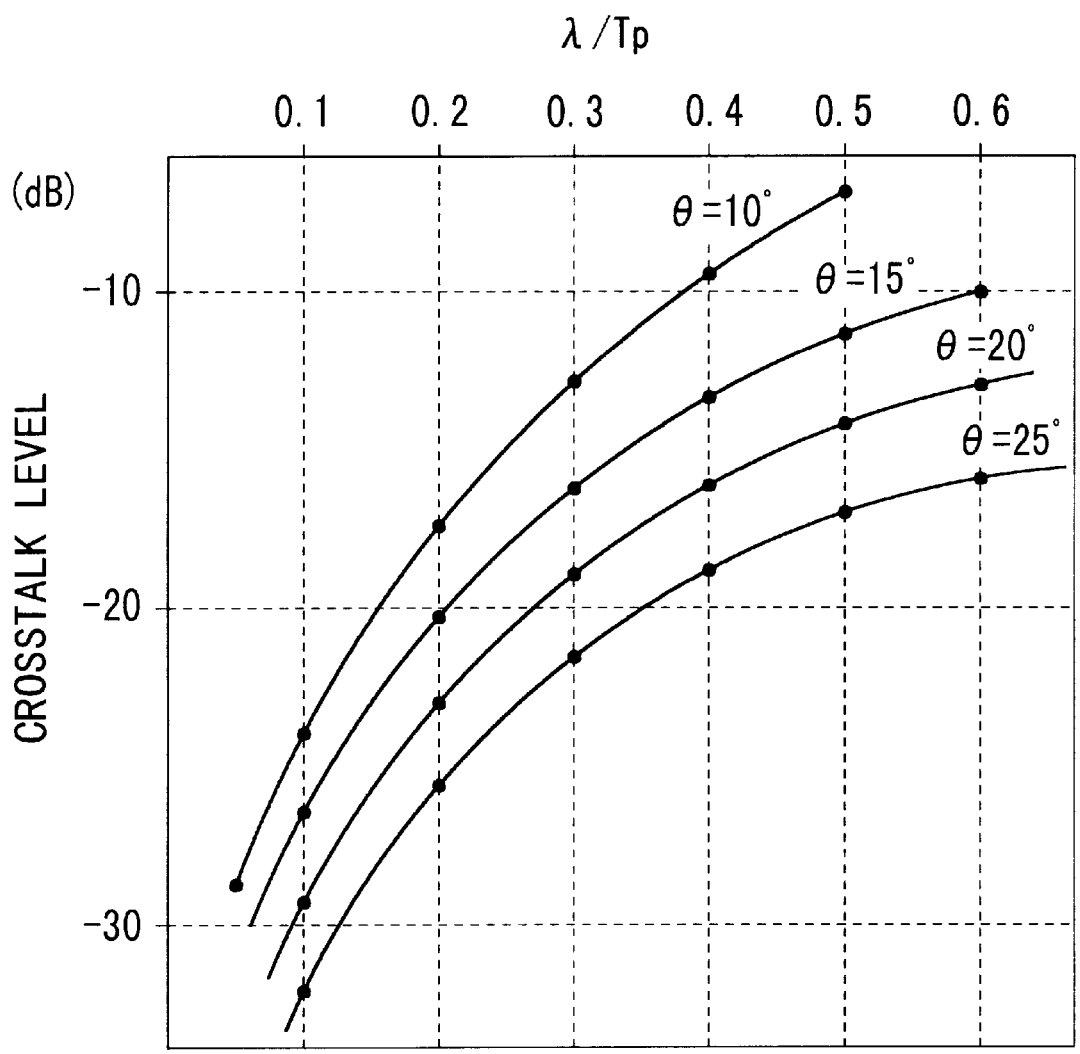

FIG. 7 is a graph showing the relationship between λ/Tp and a crosstalk level. The crosstalk level on the vertical axis thereof is represented in a dB value. Incidentally, the drawing shows results of calculations of respective azimuth angles of 10°, 15°, 20° and 25° at Tw=1.5Tp. This graph is one obtained by plotting the envelope of the vibrational function given by the equation (1). The relationship between λ/Tp and the crosstalk level is basic to the selection of the system for the record-coding, the class of the partial response and the system for the detection of the reproduced data and the setting of the width of truck (truck pitch Tp), the azimuth angles +θ and −θ of the magnetic heads 13a and 13b and the head widths Tw of the magnetic heads 13a and 13b.

The record-coding system and the reproduced-data detecting system will be explained. Curves a through c shown in FIG. 8 indicate the relationship between S/N and error rates at various systems. The curve a indicates the relationship between S/N and each error rate at the time that the recording code is defined as a 8/10 code. The curve b indicates the relationship between S/N and each error rate at the time that the recording code is defined as the 8/10 code, waveform equalization for the class 1 of the partial response is performed and a Viterbi decoding method for performing state transition during which the characteristic of the 8/10 code is introduced, is adopted.

The curve c shows the relationship between S/N and each error rate at the time that the recording code is a 8/10MSN (Matched Spectrum NULL) code, waveform equalization for the class 1 of the partial response is performed, and the Viterbi decoding method for performing state transition during which the characteristic of a 8/10MSN code is introduced, is adopted as the data detecting system (8/10TCPR1), or that the recording code is the 8/10MSN code, waveform equalization for the class 4 of the partial response is performed, and the Viterbi decoding method for performing state transition during which the characteristic of the 8/10MSN code is introduced, is adopted as the data detecting system (8/10TCPR4) (see U.S. Pat. No. 4,888,775, U.S. Pat. No. 4,888,779, U.S. Pat. No. 5,280,489, etc). As is apparent from FIG. 8, S/N necessary for the data detection can be reduced by performing recording and reproduction based on 8/10TCPR1 and 8/10TCPR4. Namely, S/N allowable to obtain a predetermined error rate can be reduced.

Now, FIG. 6B shows a waveform equalization characteristic of a class 4 (PR4) of a partial response. In the drawing, null points at which the response reaches 0, are provided at DC and fs/2 (fs: bit clock frequency). FIG. 6C shows a waveform equalization characteristic of a class (PR1) of a partial response. In the drawing, a null point at which the response reaches 0, is provided at fs/2. Further, FIG. 6E shows a power spectrum of a 8/10MSN code. In the drawing, DC is free and a null point at which the power spectrum reaches 0, is provided at fs/2. Incidentally, FIG. 6D illustrates a power spectrum of recorded data DR.

Curves a and b shown in FIG. 9 respectively show power spectrum densities of a 8/10 code and a 8/10MSN code. Both the 8/10 code and 8/10MSN code are DC-free record codes. However, the 8/10 code is lower than the 8/10MSN code in a band of frequencies lower than a frequency corresponding to 3/16 times the maximum clock frequency fch of a rectangular wave indicative of a recording signal.

Curves a and b shown in FIG. 10 respectively show power spectrum densities obtained when the 8/10MSN code is multiplied by waveform equalization characteristics of classes 1 and 4 of partial responses. The power spectrum density obtained by multiplying the 8/10MSN code by the waveform equalization characteristic of the class 4 becomes lower than that obtained by multiplying the 8/10MSN code by the waveform equalization characteristic of the class 1 in a frequency band lower than 3fch/16. Conversely, the power spectrum density obtained by multiplying the 8/10MSN code by the waveform equalization characteristic of the class 4 becomes greater than that obtained by multiplying the 8/10MSN code by the waveform equalization characteristic of the class 1 in a band of frequencies higher than 3fch/16.

Further, when the power spectrum density of the 8/10 code, which is indicated by the curve a in FIG. 9, is compared with the power spectrum density obtained by multiplying the 8/10MSN code indicated by the curve b in FIG. 10 by the waveform equalization characteristic of the class 4 of the partial response, then the power spectrum density obtained by multiplying the 8/10MSN code by the waveform equalization characteristic of the class 4 of the partial response becomes lower than that for the 8/10 code in a band of frequencies lower than 3fch/16. It is thus understood that a recording and reproducing system utilizing the 8/10MSN code and the class 4 of the partial response in combination is most reduced in low-frequency component and the crosstalk noise is reduced. Incidentally, the crosstalk noise is comprised principally of low-frequency noise. FIGS. 11 and 12 respectively show the relationship between respective parameters and error rates for azimuth-recording at the time that a 8/10TCPR1 is used. FIG. 11 shows the relationship between normalized track recording densities and error rates at the time that an azimuth angle θ is set as 25° and a track width (track pitch) Tp is changed to 2.75 μm, 5.5 μm and 11 μm where the recording code is a 8/10MSN code, the waveform equalization of the class 1 of the partial response is performed and the Viterbi decoding method is adopted as the data detecting method (8/10TCPR1). Incidentally, the head width (reproducing track width) Tw is set as 1.64Tp.

In this case, the evaluation system 100 shown in FIG. 5 has measured a white noise of 24 dB and crosstalk noise determined by the azimuth effect given by the equation (1) in a state of being added to the output signal of the magnetic recording and reproducing characteristic adder 103. This is similar even in the case of FIG. 12. When the track width is 11 μm and 5.5 μm, the normalized track recording density is in the vicinity of 2.6 and an error rate of $10^{-5}$ or so is obtained. Thus, the recording and reproducing system can obtain sufficient performance. However, when the track width is 2.75 μm, only an error rate of $10^{-3}$ or so is obtained. Thus, the recording and reproducing system is of insufficient performance.

FIG. 12 shows the relationship between azimuth angles θ and error rates at the time that in the case of the 8/10TCPR1, the normalized track recording density is defined as 2.6, and the track width is defined as 2.75 μm, 5.5 μm and 11 μm. When, in this case, the track width is set as 11 μm and 5.5 μm, an error rate of $10^{-4}$ or less is obtained if the azimuth angle θ is above 25°. Incidentally, the azimuth angle θ for obtaining the error rate of $10^{-4}$ or less when the track width is 5 μm, is above about 26° when analogized from FIG. 12. On the other hand, when the track width is 2.75 μm, the azimuth angle θ needs to take 37° or more in order to obtain the error rate of $10^{-4}$ or less. Incidentally, the azimuth angle θ for obtaining the error rate of $10^{-4}$ or less when the track width is 2 μm, reaches about 44° or more on the analogy of FIG. 12.

FIGS. 13, 14 and 15 respectively show the relationship between respective parameters and error rates for azimuth-recording at the time that a 8/10TCPR4 is used. FIG. 13 illustrates the relationship between normalized track recording densities and error rates at the time that the azimuth angle θ is defined as 15° and the track width (track pitch) Tp is changed to 2.75 μm, 5.5 μm and 11 μm where the recording code is a 8/10MSN code, the waveform equalization of the class 4 of the partial response is performed and the Viterbi decoding method is adopted as the data detecting method (8/10TCPR4). Incidentally, the head width (reproducing track width) Tw is set as 1.64Tp.

In this case, the evaluation system 100 shown in FIG. 5 has measured a white noise of 24dB and crosstalk noise determined by the azimuth effect given by the equation (1) in a state of being added to the output signal of the magnetic recording and reproducing characteristic adder 103. This is similar even in the cases of FIGS. 14 and 15. When the track width is 11 μm and 5.5 μm, an error rate of $10^{-5}$ or so is obtained when the normalized track recording density is less than or equal to 2.5. Thus, the recording and reproducing system can obtain sufficient performance. However, when the track width is 2.75 μm, only an error rate of $10^{-4}$ or so is obtained when the normalized track recording density is 2.5 or less. Thus, the recording and reproducing system is of insufficient performance.

FIG. 14 shows the relationship between normalized track recording densities and error rates at the time that in the case of the 8/10TCPR4, the azimuth angle θ is set to 25° and the track width is changed to 2.75 μm, 5.5 μm and 11 μm. When, in this case, the normalized track recording density is less than or equal to 2.5, an error rate of $10^{-5}$ or so is obtained at the case where the track width is 11 μm and 5.5 μm. Thus, the recording and reproducing system is brought to sufficient performance. Further, when the normalized track recording density is 2.4 or less, an error rate of $10^{-5}$ or so is obtained at the case where the track width is 2.75 μm. Thus, the recording and reproducing system is sufficient in performance.

FIG. 15 shows the relationship between azimuth angles θ and error rates at the time that in the case of the 8/10TCPR4, the normalized track recording density is defined as 2.4, and the track width is changed to 2.75 μm, 5.5 μm and 11 μm. When, in this case, the track width is set as 11 μm and 5.5 μm, an error rate of $10^{-4}$ or less is obtained if the azimuth angle θ is above 15°. Incidentally, the azimuth angle θ for obtaining the error rate of $10^{-4}$ or less when the track width is 5 μm, is above about 16° when analogized from FIG. 15. On the other hand, when the track width is 2.75 μm, the azimuth angle θ needs to take 25° or more in order to obtain the error rate of $10^{-4}$ or less. Incidentally, the azimuth angle θ for obtaining the error rate of $10^{-4}$ or less when the track width is 2 μm, reaches about 36° or more on the analogy of FIG. 15.

In the recording and reproducing apparatus 10 shown in FIG. 1, the selection of the system for the record-coding, the class of the partial response and the system for the detection of the reproduced data and the setting of the track width (track pitch) Tp, the azimuth angles +θ and −θ of the magnetic heads 13a and 13b and the widths Tw of the magnetic heads 13a and 13b are performed in the following manner, for example, from the above description. Namely, the channel encoder 23 performs record-coding based on the 8/10MSN code, the waveform equalizing circuit 28 performs waveform equalization based on the class 4 of the partial response, and the data detector 29 detects data by the Viterbi decoding method for executing state transition (trellis transition) during which the characteristic of the 8/10MSN code is taken. Further, the width (track pitch) of each track is set to 2 to 5 μm. In association with this, the head widths Tw of the magnetic heads 13a and 13b are set to about 1.64 times the track width Tp, i.e., 3.2 μm to 8.2 μm, and the azimuth angles +θ and −θ of the magnetic heads 13a and 13b are respectively set to 16° to 36°. It is possible to perform satisfactory magnetic recording and reproduction allowing the minimum of the error rate in this state. Thus, azimuth-recording in narrow track widths ranging from 2 μm to 5 μm can be achieved while a reduction in effective recording speed due to an increase in the azimuth angle is being controlled.

In the recording and reproducing apparatus 10 shown in FIG. 1, for example, the selection of the system for the record-coding, the class of the partial response and the system for the detection of the reproduced data and the setting of the track width (track pitch Tp), the azimuth angles +θ and −θ of the magnetic heads 13a and 13b and the widths Tw of the magnetic heads 13a and 13b are performed as follows: The channel encoder 23 performs record-coding based on the 8/10MSN code, the waveform equalizing circuit 28 performs waveform equalization based on the class 1 of the partial response, and the data detector 29 detects data by the Viterbi decoding method for executing state transition during which the characteristic of the 8/10MSN code is taken. Further, the width (track pitch) Tp of each track is set to 2 to 5 μm. In association with this, the head widths Tw of the magnetic heads 13a and 13b are set to about 1.64 times the track width Tp, i.e., 3.2 μm to 8.2 μm, and the azimuth angles +θ and −θ of the magnetic heads 13a and 13b are respectively set to 26° to 44°. It is possible to perform satisfactory magnetic recording and reproduction allowing the minimum of the error rate in this state. Thus, azimuth-recording in narrow track widths ranging from 2 μm to 5 μm can be achieved while a reduction in effective recording speed due to an increase in the azimuth angle is being controlled.

Incidentally, in the aforementioned embodiment, the present invention is applied to the magnetic tape recording and reproducing apparatus in which a magnetic recording medium is a magnetic tape T. It is however needless to say that the present invention can be applied even to a magnetic disk recording and reproducing apparatus in which a magnetic recording medium is a magnetic disk. FIG. 16 shows a principal part of a magnetic disk recording and reproducing apparatus 40. In the drawing, a pair of magnetic heads 42a and 42b is provided so as to be opposed to a recording surface of a magnetic disk 41. Upon recording and reproduction, the magnetic disk 41 is rotated about an unillustrated shaft at a constant speed in the direction indicated by an arrow R. Although its detailed description is omitted, a recording/reproduction-system circuit is configured in a manner similar to the magnetic tape recording and reproducing apparatus 10 shown in FIG. 1.

In the magnetic disk recording and reproducing apparatus 40 shown in FIG. 16, a plurality of recording tracks TR shown in FIG. 17 by way of example are concentrically recorded and formed over the magnetic disk 41. Recording tracks TRa and TRb are respectively recorded and formed by the magnetic heads 42a and 42b. Although not mentioned above, the magnetic heads 42a and 42b are different in azimuth angle from each other. Namely, gaps 44a and 44b of the magnetic heads 42a and 42b are respectively formed so as to be inclined toward a track width or pitch by +θ and −θ, whereby azimuth-recording is performed.

In order to achieve high-density recording, head widths (reproducing track widths) Tw of the magnetic heads 42a and 42b are formed narrowly and a track pitch Tp is also set smaller than the head width Tw. When the magnetic heads 42a and 42b scan a given recording track TR upon reproduction, they are set so as to scan even parts of its adjacent tracks.

In a manner similar to the magnetic tape recording and reproducing apparatus 10 even in the case of the magnetic disk recording and reproducing apparatus 40 shown in FIG. 16, the selection of the system for the record-coding, the class of the partial response and the system for the detection of the reproduced data and the setting of the track width (track pitch Tp), the azimuth angles +θ and −θ of the magnetic heads 42a and 42b and the widths Tw of the magnetic heads 42a and 42b are performed. As a result, similar operation and effects can be obtained.

According to the present invention, a reproduction system detects data after the execution of waveform equalization based on a partial response. A recording system converts digital data to a code sequence in which DC is free and null points of each frequency spectrum are respectively provided at null points of a waveform equalization characteristic of the partial response, and records it therein. Thus, crosstalk noise comprised principally of low-frequency noise can be reduced. It is also possible to reduce S/N allowable to obtain a predetermined error rate. Further, azimuth-recording in a narrow track width can be achieved.

INDUSTRIAL APPLICABILITY

The magnetic recording apparatus or the like according to the present invention as has been described above is suitable for application to a recording/reproducing apparatus using magnetic recording media such as a magnetic tape, a magnetic disk, etc.

What is claimed is:

1. A magnetic recording apparatus, comprising:
 data input means for allowing data to be input;
 coding means for converting the data to a code sequence that is dc-free and with null points of each frequency spectrum being respectively provided at null points of a waveform equalization characteristic of a predetermined partial response; and
 recording means having a first recording head with a first azimuth angle and a second recording head with a second azimuth angle different from said first azimuth angle, said recording means recording part of said code sequence onto a first track on a magnetic recording medium through the use of said first recording head and recording the other part of said code sequence onto a second track adjacent to said first track on the magnetic recording medium through the use of said second recording head.

2. The magnetic recording apparatus according to claim 1, wherein said predetermined partial response is a class 4.

3. The magnetic recording apparatus according to claim 2, wherein the width of said first track and the width of said second track respectively range from 2 μm to 5.5 μm, the difference between said first azimuth angle and said second azimuth angle ranges from 30° to 72°, and the width of said first recording head and the width of said second recording head respectively range from 3.2 μm to 9.0 μm.

4. The magnetic recording apparatus according to claim 1, wherein said predetermined partial response is a class 1.

5. The magnetic recording apparatus according to claim 4, wherein the width of said first track and the width of said second track respectively range from 2 μm to 5.5 μm, the difference between said first azimuth angle and said second azimuth angle ranges from 50° to 88°, and the width of said first recording head and the width of said second recording head respectively range from 3.2 μm to 9.0 μm.

6. A magnetic reproducing apparatus for reproducing data from a magnetic recording medium, said data being converted to a code sequence that is dc-free and with null points of a frequency spectrum being respectively provided at null points of a waveform equalization characteristic of a predetermined partial response, said recording medium having a first track on which part of said code sequence is recorded by a first recording head having a first azimuth angle and a second track adjacent to said first track, on which the other part of said code sequence is recorded by a second recording head having a second azimuth angle different from the first azimuth angle, comprising:
 reproducing means having a first reproducing head with an azimuth angle identical to said first azimuth angle and a second reproducing head with an azimuth angle identical to said second azimuth angle, said reproducing means reproducing a signal from the first track by means of said first reproducing head and reproducing a signal from the second track by means of said second reproducing head;
 waveform equalizing means for effecting waveform equalization based on the predetermined partial response on the signals reproduced by said first and second reproducing heads;

data detecting means for detecting the code sequence from the waveform-equalized signals by maximum likelihood decoding; and decoding means for decoding the detected code sequence thereby to obtain the data.

7. The magnetic reproducing apparatus according to claim 6, wherein said predetermined partial response is a class 4.

8. The magnetic reproducing apparatus according to claim 7, wherein the width of said first track and the width of said second track respectively range from 2 μm to 5.5 μm, the difference between said first azimuth angle and said second azimuth angle ranges from 30 to 72°, and the width of said first reproducing head and the width of said second reproducing head respectively range from 3.21 μm to 9.0 μm.

9. The magnetic reproducing apparatus according to claim 6, wherein said predetermined partial response is a class 1.

10. The magnetic reproducing apparatus according to claim 9, wherein the width of said first track and the width of said second track respectively range from 2 μm to 5.5 μm, the difference between said first azimuth angle and said second azimuth angle ranges from 50° to 88°, and the width of said first reproducing head and the width of said second reproducing head respectively range from 3.2 μm to 9.0 μm.

11. A magnetic recording and reproducing apparatus, comprising:

data input means for allowing data to be input;

coding means for converting the data to a code sequence that is dc-free and with null points of each frequency spectrum being respectively provided at null points of a waveform equalization characteristic of a predetermined partial response;

access means having a first head with a first azimuth angle and a second head with a second azimuth angle different from said first azimuth angle, said access means recording part of said code sequence onto a first track on a magnetic recording medium through the use of said first head, recording the other part of said code sequence onto a second track adjacent to said first track on the magnetic recording medium through the use of said second head, reproducing a signal from said first track by using said first head and reproducing a signal from said second track by using said second head;

waveform equalizing means for effecting waveform equalization based on said predetermined partial response on the signals reproduced by said first and second heads;

data detecting means for detecting the code sequence from the wave form-equalized signals by maximum likelihood decoding; and decoding means for decoding the detected code sequence thereby to obtain the data.

12. The magnetic recording and reproducing apparatus according to claim 11, wherein said predetermined partial response is a class 4.

13. The magnetic recording and reproducing apparatus according to claim 12, wherein the width of said first track and the width of said second track respectively range from 2 μm to 5.5 μm, the difference between said first azimuth angle and said second azimuth angle ranges from 30° to 72°, and the width of said first head and the width of said second head respectively range from 3.2 μm to 9.0 μm.

14. The magnetic recording and reproducing apparatus according to claim 11, wherein said predetermined partial response is a class 1.

15. The magnetic recording and reproducing apparatus according to claim 14, wherein the width of said first track and the width of said second track respectively range from 2 μm to 5.3 μm, the difference between said first azimuth angle and said second azimuth angle ranges from 50° to 88°, and the width of said first head and the width of said second head respectively range from 3.2 μm to 9.0 μm.

16. A magnetic recording method, comprising the following steps:

a data inputting step for allowing data to be input;

a coding step for converting the data to a code sequence that is dc-free and with null points of a frequency spectrum being respectively provided at null points of a waveform equalization characteristic of a predetermined partial response; and a recording step for recording part of the code sequence onto a first track on a magnetic recording medium by using a first recording head having a first azimuth angle and recording the other part of the code sequence onto a second track adjacent to the first track on the magnetic recording medium by using a second recording head having a second azimuth angle different from the first azimuth angle.

17. The magnetic recording method according to claim 16, wherein said predetermined partial response is a class 4.

18. The magnetic recording method according to claim 17, wherein the width of said first track and the width of said second track respectively range from 2 μm to 5.5 μm, the difference between said first azimuth angle and said second azimuth angle range, from 30° to 72°, and the width of said first recording head and the width of said second recording head respectively range from 3.2 μm to 9.0 μm.

19. The magnetic recording method according to claim 16, wherein said predetermined partial response is a class 1.

20. The magnetic recording method according to claim 19, wherein the width of said first track and the width of said second track respectively range from 2 μm to 5.5 μm, the difference between said first azimuth angle and said second azimuth angle ranges from 50° to 88°, and the width of said first recording head and the width of said second recording head respectively range from 3.2 μm to 9.0 μm.

21. A magnetic reproducing method for reproducing data from a magnetic recording medium, said data being converted to a code sequence that is dc-free and with null points of a frequency spectrum being respectively provided at null points of a waveform equalization characteristic of a predetermined partial response, said recording medium having a first track on which part of said code sequence is recorded by a first recording head having a first azimuth angle and a second track adjacent to said first track, on which the other part of said code sequence is recorded by a second recording head having a second azimuth angle different from the first azimuth angle, comprising the following steps:

a reproducing step for reproducing a signal from the first track by using a first reproducing head having an azimuth angle identical to said first azimuth angle and reproducing a signal from the second track by using a second reproducing head having an azimuth angle identical to said second azimuth angle;

a waveform equalizing step for effecting waveform equalization based on the predetermined partial response on the signals reproduced by said first and second reproducing heads;

a data detecting step for detecting the code sequence from the waveform-equalized signals by maximum likelihood decoding; and a decoding step for decoding the detected code sequence thereby to obtain the data.

22. The magnetic reproducing method according to claim 21, wherein said predetermined partial response is a class 4.

23. The magnetic reproducing method according to claim 22, wherein the width of said first track and the width of said second track respectively range from 2 µm to 5.5 µm, the difference between said first azimuth angle and said second azimuth angle ranges from 30° to 72°, and the width of said first reproducing head and the width of said second reproducing head respectively range from 3.2 µm to 9.0 µm.

24. The magnetic reproducing method according to claim 21, wherein said predetermined partial response is a class 1.

25. The magnetic reproducing method according to claim 24, wherein the width of said first track and the width of said second track respectively range from 2 µm to 5.5 µm, the difference between said first azimuth angle and said second azimuth angle ranges from 50° to 88°, and the width of said first reproducing head and the width of said second reproducing head respectively range from 3.2 µm to 9.0 µm.

26. A magnetic recording and reproducing method, comprising the following steps:

a data inputting step for allowing data to be input;

a coding step for converting the data to a code sequence that is dc-free and with null points of a frequency spectrum being respectively provided at null points of a waveform equalization characteristic of a predetermined partial response;

a recording step for recording part of the code sequence onto a first track on a magnetic recording medium by using a first head having a first azimuth angle and recording the other part of the code sequence onto a second track adjacent to the first track on the magnetic recording, medium by using a second head having a second azimuth angle different from the first azimuth angle;

a reproducing step for reproducing a signal from the first track by using the first head and reproducing a signal from the second track by using the second head;

a waveform equalizing step for effecting waveform equalization based on said predetermined partial response on the signals reproduced by said first and second heads;

a data detecting step for detecting the code sequence from the wave form-equalized signals by maximum likelihood decoding; and a decoding step for decoding the detected code sequence thereby to obtain the data.

27. The magnetic recording and reproducing method according to claim 26, wherein said predetermined partial response is a class 4.

28. The magnetic recording and reproducing method according to claim 27, wherein the width of said first track and the width of said second track respectively range from 2 µm to 5.5 µm, the difference between said first azimuth angle and said second azimuth angle ranges from 30° to 72°, and the width of said first head and the width of said second head respectively range from 3.2 µm to 9.0 µm.

29. The magnetic recording and reproducing method according to claim 26, wherein said predetermined partial response is a class 1.

30. The magnetic recording and reproducing method according to claim 29, wherein the width of said first track and the width of said second track respectively range from 2 µm to 5.5 µm, the difference between said first azimuth angle and said second azimuth angle ranges from 50° to 88°, and the width of said first head and the width of said second head respectively range from 3.2 µm to 9.0 µm.

\* \* \* \* \*